(No Model.) 3 Sheets—Sheet 1.
T. TAYLOR.
MACHINE FOR TREATING COTTON SEED.
No. 306,292. Patented Oct. 7, 1884.
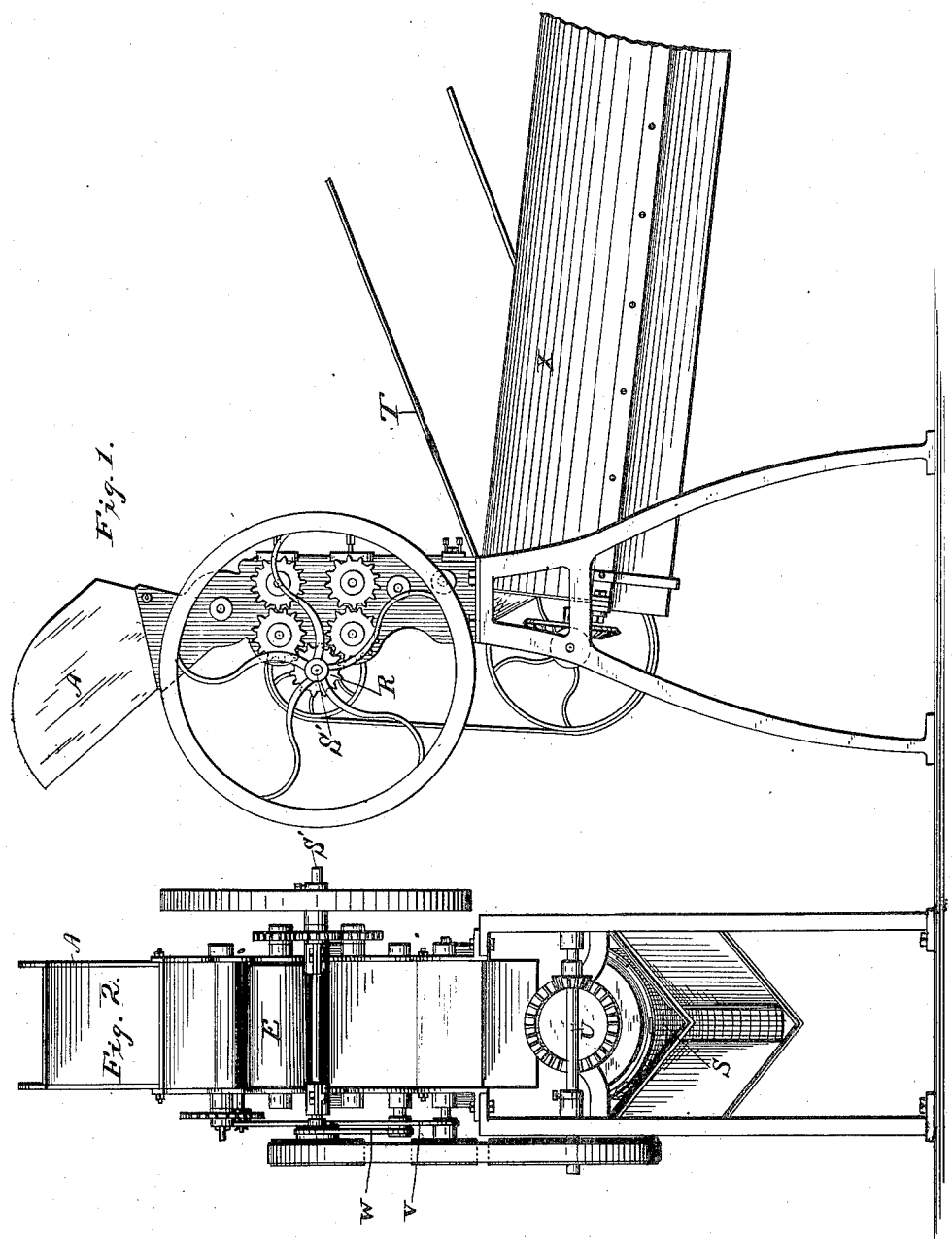
WITNESSES
Chas. R. Burr
Fred F. Church
INVENTOR
Thomas Taylor
by Church & Church
his Attorney (No Model.) 3 Sheets—Sheet 2.
T. TAYLOR.
MACHINE FOR TREATING COTTON SEED.
No. 306,292. Patented Oct. 7, 1884.
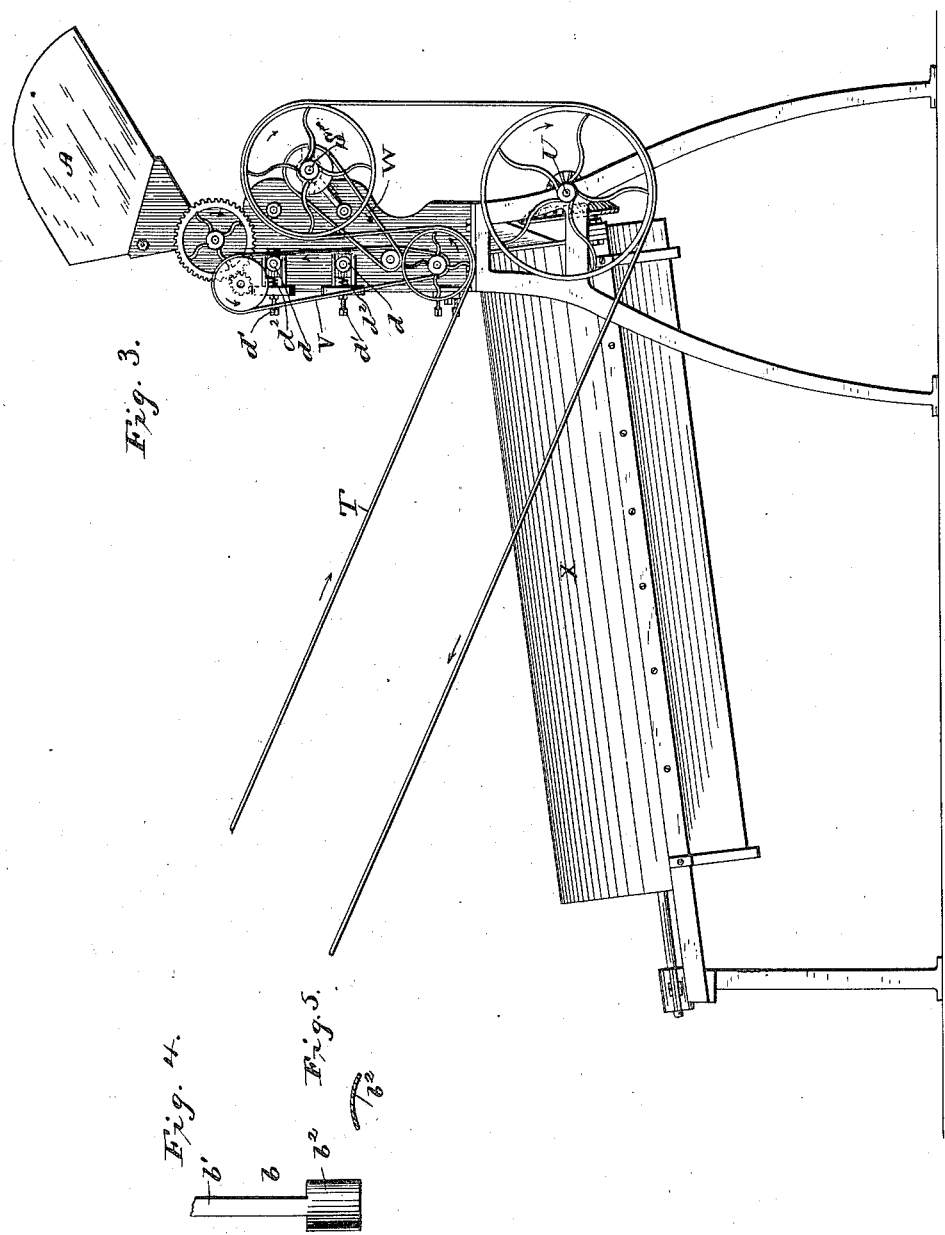
WITNESSES
INVENTOR

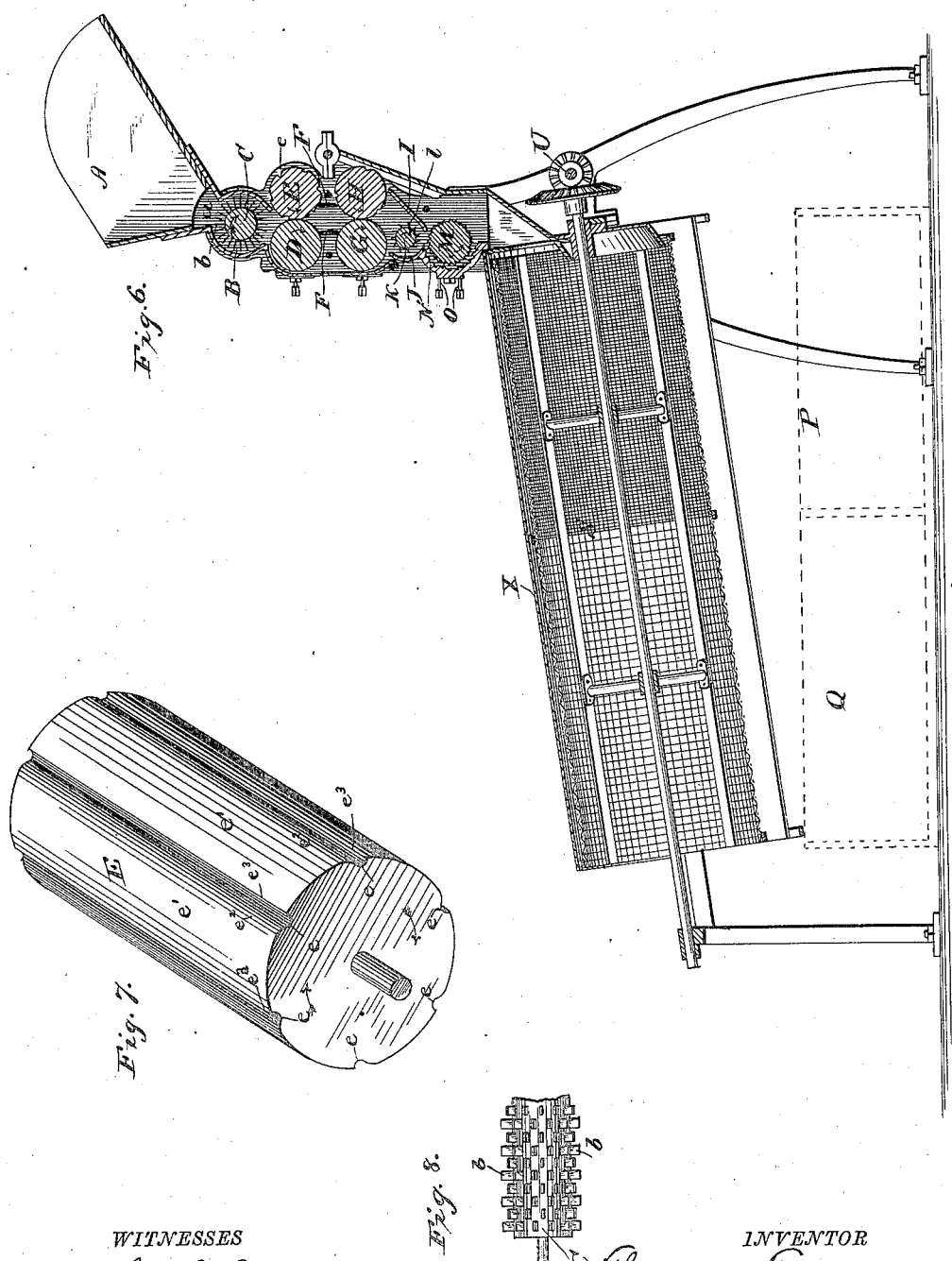

UNITED STATES PATENT OFFICE.

THOMAS TAYLOR, OF WASHINGTON, DISTRICT OF COLUMBIA.

MACHINE FOR TREATING COTTON-SEED.

SPECIFICATION forming part of Letters Patent No. 306,292, dated October 7, 1884.

Application filed July 8, 1884. (No model.)

*To all whom it may concern:*

Be it known that I, THOMAS TAYLOR, of Washington, in the District of Columbia, have invented certain new and useful Improvements in Machines for Treating Cotton-Seed; and I do hereby declare the following to be a full, clear, and exact description of the same, reference being had to the accompanying drawings, forming a part of this specification, and to the figures and letters of reference marked thereon.

In Letters Patent of the United States No. 276,305, granted to me on the 24th day of April, 1883, I described an improved mode or process of treating cotton-seed, consisting in, first, drying the seed, then crushing it, so as to simultaneously break the hull and pulverize the kernel, and then separating the pulverized kernel from the hull particles and adherent fiber; and in the same patent I also described and illustrated a form of machine by which the said process could be carried out. Since my said patent was issued I have been engaged in improving the machinery for carrying out the process, and after a series of practical tests with machines of different construction I have adopted the form of machine hereinafter described because of its cheapness, compactness, and general availability.

I will first describe the said machine at length with reference to the accompanying drawings, and will then point out its particular points of novelty in the claims at the end of this specification.

In the said drawings, Figures 1 and 3 are side elevations of the machine, taken from opposite sides. Fig. 2 is an end view of the machine. Figs. 4 and 5 are detail views of the blades of the upper feeding-cylinder. Fig. 6 represents a longitudinal section of the machine. Fig. 7 is a perspective view of one of the upper crushing-rolls. Fig. 8 is a plan view of a portion of the upper feeding-cylinder, showing the arrangement of blades thereon.

Similar letters of reference in the several figures indicate the same parts.

In carrying out my said improved process with this new machine, the cotton-seed, after having first been properly dried by heat or otherwise, is fed into the hopper A at the upper end of the machine, whence it passes down through the throat $a$ into a chamber, B, in which is located a revolving feeding-cylinder, C, armed with rows of projecting blades $b$, arranged preferably in spiral lines, and so that the blades in one row stand opposite the spaces between the blades in the next succeeding row, as shown in Fig. 8. Each of the blades is provided with a shank, $b'$, adapted to be driven into the cylinder C, (which latter is preferably made of wood,) and with an outer broadened end, $b^2$, which may be flat or corrugated, but is preferably constructed in concavo-convex form, as shown in Figs. 4 and 5, and set so that as the cylinder rotates the concave side is to the front. The ends of the blades extend in close proximity to the concentric walls of the chamber B, from which it results that when the hopper is filled with seed and the feeding-cylinder set in motion, only so much of the seed as is positively drawn from the throat of the hopper by the blades is allowed to be fed down and discharged onto the rollers D E, and it may be said in passing that the speed of the feeding-cylinder is so regulated with respect to the speed and capacity of the said rolls D E that only such amount of seed is supplied to the rolls as can be disposed of by the latter without permitting an accumulation of material upon them. The roll E extends from side to side of the machine, and is mounted so as to turn freely in fixed bearings. Its surface is provided with a number of longitudinal grooves or channels, $e$, which at one edge, $e^2$, are preferably rounded, and at the other, $e^3$, terminate rather abruptly, as shown in Figs. 6 and 7. The roll D, on the other hand, though extending from side to side of the machine, has a substantially smooth surface, and is mounted in sliding boxes $d$, behind which are adjusting-screws $d'$ and interposed springs $d^2$. As the seed is delivered onto the rolls D E a quantity of it is caught in turn in each of the grooves of the roll E, and is carried down between said roll E and the smooth roll D. The depth of the grooves is considerably less than the thickness of the seed, and hence as the center or point of greatest pressure is reached the smooth roll is caused to yield slightly, and the space between the rolls being thereby momentarily increased the superposed layer of fiber-coated seed is caught between the smooth concave portion e of the roll E and the opposite surface of the roll D and is drawn down through between the rolls, this operation being continually repeated while the machine remains in motion. The seed in the grooves is squeezed so that its hull is cracked and its kernel pulverized into coarse meal, while the seed that is operated upon by the smooth unbroken surfaces of the two rolls is also cracked and its kernel reduced, though more thoroughly and to a greater degree.

The grooves in the roll E are not designed to increase the crushing action of the rolls, except incidentally, as it has been demonstrated in practice that plain smooth rolls are well adapted to effect the desired crushing, but are incapable alone of properly feeding or drawing the cotton-seed between them when set at the proper distance to crush. This is owing, in a great measure, to the nature of the material to be acted upon and its light adherent condition. It is to overcome this difficulty in feeding and at the same time preserve the advantages of the smooth rolls that the grooves of the character described are formed in one roll. These grooves are made shallow relative to the diameter of the seed in order that the latter may not be passed through unacted upon, and are formed with an abrupt shoulder or wall on the lower side, that the seed may not fall through, and with the gradually-inclined or tapering upper wall, that the seeds may be crushed thereon, instead of being cut. As the grooves in the roll E approach the opposite roll from above the seeds are received into the pockets thus formed, the space being increased at this point between the proximate faces of the rolls. The lower shoulder prevents any seed from passing entirely through, and as the rolls continue to revolve the material, which is more or less matted and held together by the fiber, is drawn down into the bite of the rolls, the incline of the upper wall of the groove permitting the crushing action to continue without effecting at once a separation of the material in the grooves from the mass resting above and more or less connected by the fiber. After the material has passed through between the upper rolls, D E, it descends between guides F F onto and between the second pair of rolls, G H, which are mounted in the same manner as the upper pair of rolls, and only differ from the latter in construction in that the roll H has fewer and shallower longitudinal channels or grooves than the roll E above it, so as to afford a greater area of smooth surface for acting upon and crushing or grinding the kernel. The lower pair of rolls are adjustable closer together than the upper pair, and operate to reduce the kernel to much finer meal and to break and grind up finer the hull particles. Passing from the second pair of rolls, the material descends into a space or compartment bounded on one side by an inclined wall, I, and on the other by a concave wall, J, and containing a rotating feed-cylinder, K, armed with pins or teeth l. The function of this feed-cylinder is to evenly and regularly feed the material to and between a cylinder and concave, M N, as shown, and its teeth are set tangentially and inclined from the direction of rotation, so that while they will positively draw the material down to the opening between the cylinder and concave they will not retain upon them any of the fiber and become clogged, as they would were they set radially or inclined in the opposite direction. The function of the cylinder and concave is to thoroughly disengage the meal from the hull particles and adherent fiber. They are both serrated or toothed, as shown, and the concave is rendered capable of being set at any desired adjustment by means of suitable set-screws, O. For convenience, the concave J is mounted or formed upon the concave N, and is adjusted to or from the feed-cylinder K, to conform to the adjustment of the serrated concave N with respect to its co-operating cylinder. Below the cylinder and concave is arranged an inclined revolving screen, S, the upper portion of which is preferably covered with wire-cloth of finer mesh, while its lower portion is covered with wire-cloth of larger mesh. On the passage of the material from the cylinder and concave into and down through this revolving screen, the higher grade of meal is separated out in passing over the finer screen, while the coarser grade is passed through the larger meshes at the lower part of the screen, the fiber and what hull particles have failed to pass through the larger meshes being tailed off at the lower end of the screen. Suitable hoppers or receivers, P Q, are placed beneath the different sections of the screen for the purpose of collecting the different grades of meal.

While I have only shown two sizes of wire upon the screen, it is obvious that the number may be increased so as to divide the meal product into a greater number of grades.

Motion is preferably imparted to both sets of rolls through a series of gears driven from a gear, R, mounted on the fly-wheel shaft S', that is provided with a large pulley, and is driven from the main power-belt T. The latter also, through suitable pulleys, drives the toothed cylinder M and the shaft U, which imparts motion through suitable bevel-pinions to the reel or screen. The upper feed-cylinder, C, receives motion from the shaft of the toothed cylinder M through a belt, V, and suitable gearing, as shown in Fig. 3, while the lower feed-cylinder is driven by a belt, W, from a pulley on the shaft S'.

The revolving screen is preferably covered by a suitable casing, X.

While this machine has been especially designed for the grinding of cotton-seed and the separation of its ground kernel or meal from the hull particles and adherent fiber, it is also adapted to the grinding of sorghum, corn, oats, and other grain. This adaptability renders it possible for a planter with a single machine to prepare not only cotton-seed meal in a clean and pure state free from fiber and hull particles for stock-feeding or fertilizing purposes, but also to grind for his stock the oats, corn, and other grains which he ordinarily has to send to a distant mill to be ground.

Having thus described my invention, what I claim as new is—

1. As a means for effecting a continuous and uniform feed of cotton-seed, and in combination with a hopper or receptacle and the curved feeding-chamber, the revolving cylinder provided with a series of blades whose broad curved faces are arranged longitudinally of the cylinder, substantially as described.

2. In a machine for crushing or grinding cotton-seed, the combination of an upper pair of rolls, one of which is smooth and the other of which is provided with a series of longitudinal grooves having abrupt shoulders, such as described, and plain surfaces between the grooves, with a second pair of rolls arranged beneath the first-mentioned pair, and the one smooth and the other having longitudinal grooves shallower than those of the corresponding upper roll and less in number, leaving wider plain surfaces between the grooves, all operating substantially as described.

3. In the herein-described machine for crushing and grinding cotton-seed, the combination, with the co-operating crushing-rolls, of the rotary toothed feeding-cylinder arranged beneath said rolls, and the serrated cylinder and concave, substantially as described, for the purpose set forth.

4. In the herein-described machine for crushing or grinding cotton-seed, and in combination with the crushing-rolls and serrated cylinder and concave thereof, the rotary feeding-cylinder having its teeth set tangentially, as described, and the chamber in which said feeding-cylinder works, having one side inclined and the other curved and concentric with the feeding-cylinder, substantially as described.

5. The combination, with the feeding-cylinder having the tangentially-arranged teeth, the chamber in which said cylinder is located, the serrated cylinder and concave, the latter being adjustable and carrying the curved wall of the feeding-cylinder chamber, whereby the adjustment of the serrated concave also effects the adjustment of the concave side of said feeding-cylinder-chamber, substantially as described.

6. The herein-described machine for crushing or grinding cotton-seed, consisting of the hopper and upper feeding-cylinder having the broad blades, the pairs of crushing-rolls consisting each of a smooth roll and a grooved roll, such as described, the lower feeding cylinder having the tangentially-arranged teeth, the serrated cylinder and concave, and the revolving screen, the whole constructed and arranged substantially as described.

THOMAS TAYLOR.

Witnesses:
FRED F. CHURCH,
CHAS. R. BURR.